US009347401B2

(12) United States Patent
Zhu et al.

(10) Patent No.: US 9,347,401 B2
(45) Date of Patent: May 24, 2016

(54) LAMBDA FEEDBACK CONTROL FOR ROBUST PARTICULATE EMISSIONS PERFORMANCE

(71) Applicant: Cummins Inc., Columbus, IN (US)

(72) Inventors: Yongjie Zhu, Troy, MI (US); Vivek Anand Sujan, Columbus, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 272 days.

(21) Appl. No.: 14/044,368

(22) Filed: Oct. 2, 2013

(65) Prior Publication Data

US 2014/0109883 A1 Apr. 24, 2014

Related U.S. Application Data

(60) Provisional application No. 61/715,599, filed on Oct. 18, 2012.

(51) Int. Cl.
| | |
|---|---|
| *F02D 41/14* | (2006.01) |
| *F02M 25/07* | (2006.01) |
| *F02D 41/00* | (2006.01) |
| *F02D 11/10* | (2006.01) |

(52) U.S. Cl.
CPC ............ *F02M 25/07* (2013.01); *F02D 41/0007* (2013.01); *F02D 41/0052* (2013.01); *F02D 41/1402* (2013.01); *F02D 41/1456* (2013.01); *F02D 41/1461* (2013.01); *F02D 11/105* (2013.01); *F02D 2041/1409* (2013.01); *F02D 2041/1418* (2013.01); *F02D 2041/1422* (2013.01); *Y02T 10/144* (2013.01); *Y02T 10/47* (2013.01)

(58) Field of Classification Search
CPC F02M 25/07; F02D 41/0052; F02D 41/1402; F02D 2041/1409; F02D 41/1483
USPC ............ 123/436, 672, 696, 703, 704, 568.21; 701/103, 108, 109, 110
See application file for complete search history.

(56) References Cited

U.S. PATENT DOCUMENTS

| | | |
|---|---|---|
| 6,273,076 B1 | 8/2001 | Beck et al. |
| 6,705,303 B2 | 3/2004 | Itoyama et al. |
| 6,948,475 B1 | 9/2005 | Wong et al. |
| 7,047,741 B2 | 5/2006 | Gray, Jr. |
| 7,142,610 B1 | 11/2006 | Wang et al. |
| 7,591,135 B2 | 9/2009 | Stewart |
| 8,700,291 B2 * | 4/2014 | Herrmann ..................... 701/108 |
| 2006/0196486 A1 | 9/2006 | Wang et al. |
| 2009/0205617 A1 | 8/2009 | Tonetti et al. |
| 2014/0109868 A1 * | 4/2014 | Zhu et al. ...................... 123/349 |

* cited by examiner

*Primary Examiner* — Hai Huynh
(74) *Attorney, Agent, or Firm* — Taft Stettinius & Hollister LLP

(57) ABSTRACT

Methods are disclosed for reducing the variability of particulate emissions in an exhaust stream from an internal combustion engine using a lambda error and/or a $NO_x$ error to control an exhaust gas recirculation fraction and/or a mass charge flow control. The methods include operating a controller to adjust the engine gas recirculation fraction and/or the mass charge flow control.

27 Claims, 8 Drawing Sheets

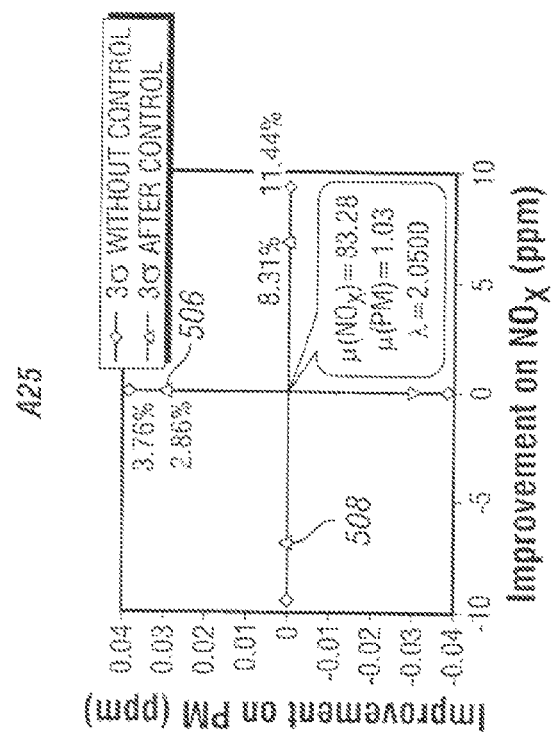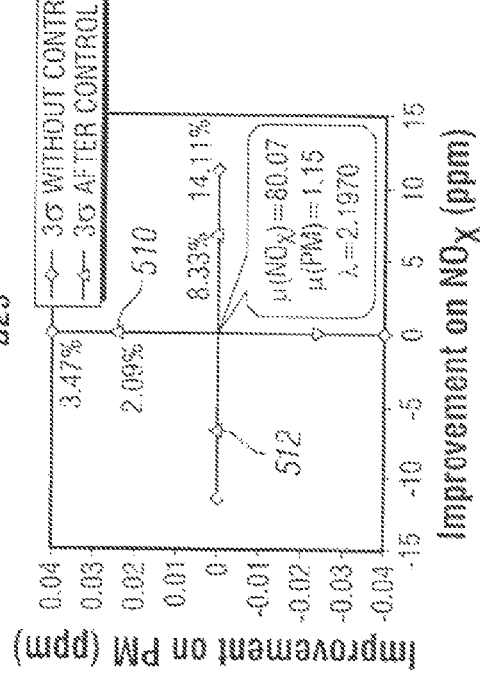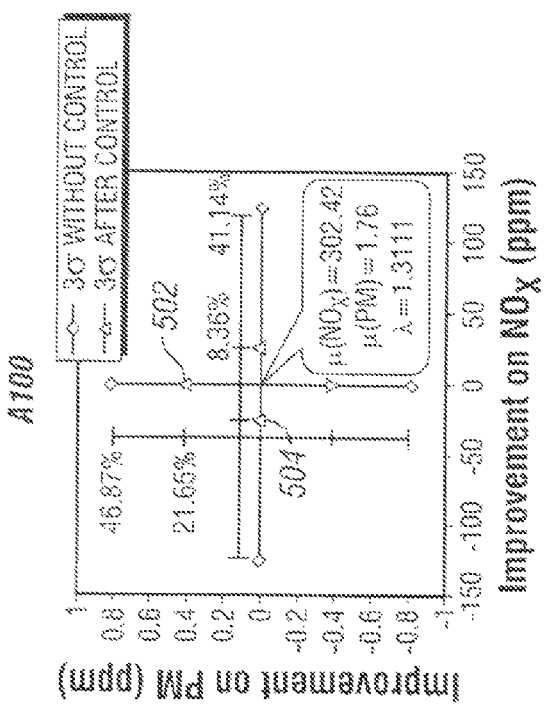
FIG. 5A
FIG. 5B
FIG. 5C

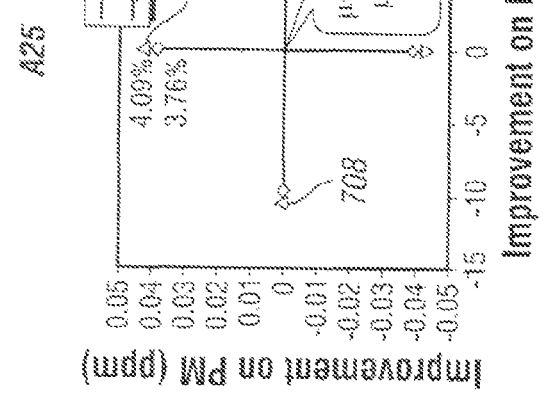
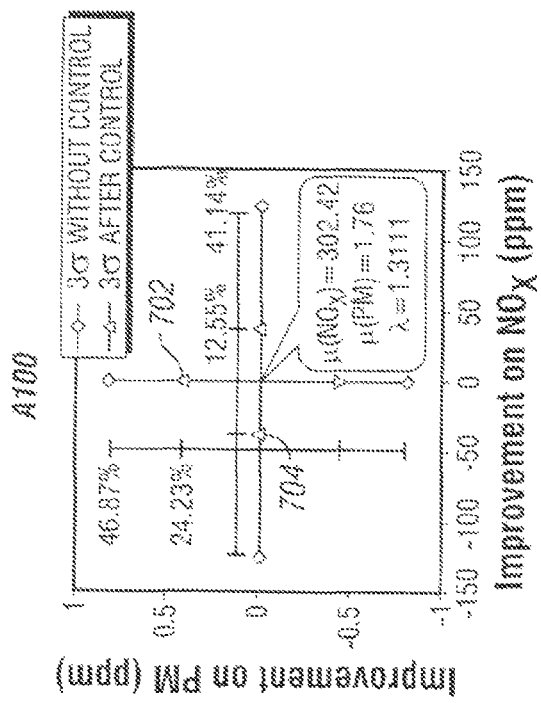
FIG. 7A
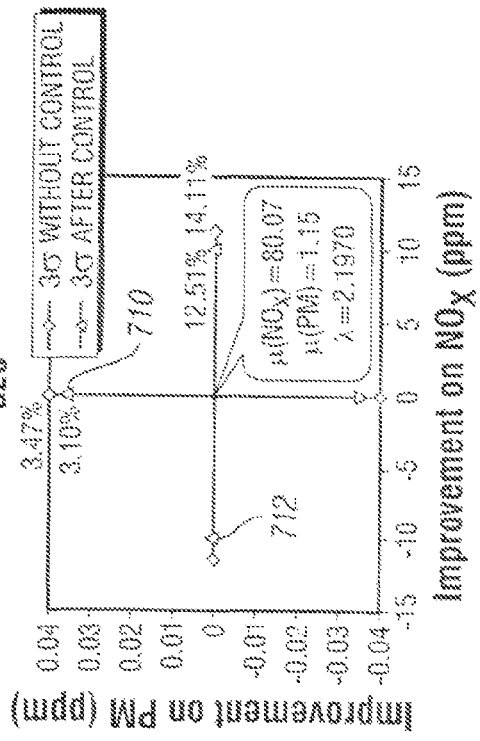
FIG. 7B
FIG. 7C

LAMBDA FEEDBACK CONTROL FOR ROBUST PARTICULATE EMISSIONS PERFORMANCE

RELATED APPLICATIONS

The present application claims priority to U.S. Provisional Patent Application 61/715,599 filed on Oct. 18, 2012, and which is incorporated herein by reference in its entirety for all purposes.

BACKGROUND

The technical field generally relates to particulate emissions control in an internal combustion engine. Particulate emissions in an internal combustion engine are subject to a high amount of variability. This variability causes unpredictable emissions behavior, and affects the performance of aftertreatment components such as a particulate filter. High variability in particulate emissions also has a negative effect on particulate emissions estimation algorithms. It is desirable to reduce the variability in particulate emissions without interfering with engine responsiveness, causing excess $NO_x$ emissions, or causing excess variability in $NO_x$ emissions. Therefore, further technological developments are desirable in this area.

SUMMARY

One embodiment is a unique method to interpret a lambda error and/or a $NO_x$ error to control an exhaust gas recirculation fraction and/or a mass charge flow control to reduce the variability of particulate emissions from an exhaust of an internal combustion engine. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIGS. 5A-5C are a series of plot diagrams illustrating output control plots of simulated performance data for the $NO_x$-EGR controller at 10% NOx bias.

FIGS. 7A-7C are a series of plot diagrams illustrating output control plots of simulated performance data for the $NO_x$-EGR controller at 15% NOx bias.

DESCRIPTION OF THE ILLUSTRATIVE EMBODIMENTS

Figure 1:
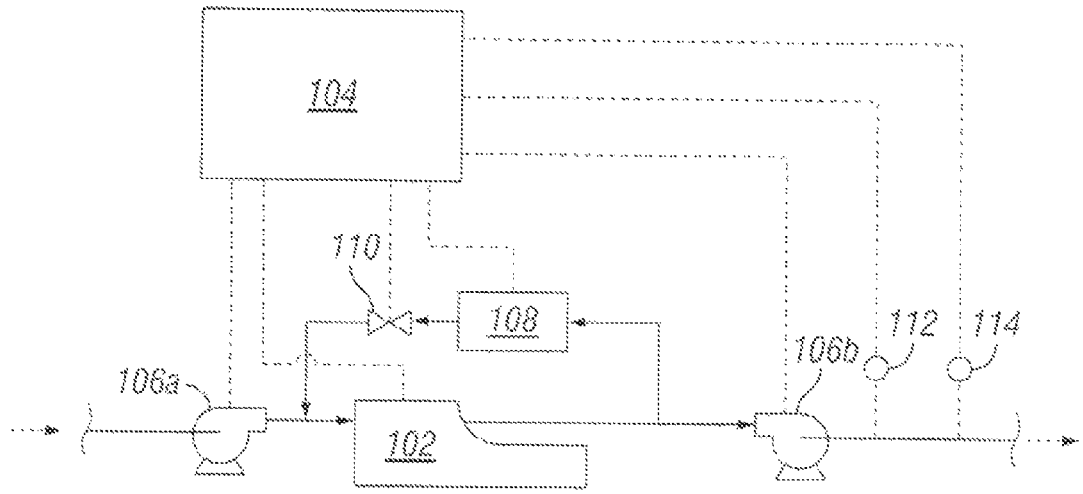
FIG. 1 is a schematic illustration of a system including an exemplary turbocharger and an emissions variability controller.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 depicts a system 100 having an internal combustion engine 102. The engine 102 may be of any type. Engines 102 produce $NO_x$ emissions and particulate emissions, and may include aftertreatment components (not shown) that capture and/or treat some of the emissions before the emissions are released to the atmosphere. The example system 100 includes a compressor 106a and a turbine 106b forming a turbocharger. It is known that turbocharged engines typically experience higher combustion temperatures and therefore create a higher $NO_x$ output than engines which are not turbocharged.

Modern emissions regulations drive many systems to utilize $NO_x$ aftertreatment systems, such as a selective catalytic reduction (SCR) system (not shown). SCR systems utilize reductant injection, which provides for reduction of $NO_x$ to $N_2$ on a specially designed catalyst. Modern emissions regulations also drive many systems to utilize particulate aftertreatment systems, such as a particulate filter (not shown). Particulate filters capture soot over a period of time, and then are regenerated in the presence of elevated temperatures and an oxidizing agent (e.g. oxygen or $NO_2$). Systems which experience a high variability in the output of $NO_x$ or particulates, including SCR systems or particulate filters, can experience failures or system faults, increased operating costs, and/or experience challenges in properly regenerating or meeting emissions requirements.

The system 100 further includes an exhaust gas recirculation (EGR) loop, including an EGR cooler 108 and an EGR valve 110. Alternatively or additionally, the EGR cooler may be present or not, and may have a bypass or not. The EGR valve 110 may be present or not, and may be positioned upstream or downstream of the EGR cooler 108. The EGR loop in the example system 100 is a high pressure EGR loop, but the EGR loop may be high pressure, low pressure, both, or not present.

The system 100 further includes a lambda (λ) detection device 112. The λ detection device 112 determines the actual air-fuel ratio in the system, and may determine the exhaust air-fuel ratio, the EGR loop air-fuel ratio, and/or the intake oxygen amount from which the air-fuel ratio may be determined. The λ detection device 112 may determine a λ value directly, such as with a wide range oxygen sensor as known in the art, and/or may determine the λ value indirectly, such as by determining an oxygen concentration at a location in the system, and utilizing engine fueling values and other parameters to calculate the λ value. The λ value is the ratio of actual oxygen at the intake to the stoichiometric ratio of oxygen.

The example system 100 further includes a $NO_x$ detection device 114. The $NO_x$ detection device 114 may be a $NO_x$ sensor, and may additionally provide for oxygen detection. The system 100 further includes a controller 104. The controller 104 forms a portion of a processing subsystem including one or more computing devices having memory, processing, and communication hardware. The controller may be a single device or a distributed device, and the functions of the controller may be performed by hardware or software. The controller 104 is in communication with any actuators, sensors, datalinks, computing devices, wireless connections, or other devices to be able to perform any described operations.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

An example controller includes an emissions variability module that interprets an engine speed value and an engine load value, and determines a target $NO_x$ value in response to the engine speed value and the engine load value. The target $NO_x$ value from the engine speed value and the engine load value may be determined from a lookup table, and may include values, for example, designed to meet an overall emissions level for the engine. The emissions variability module further determines a $NO_x$ error value in response to the target $NO_x$ value and the exhaust $NO_x$ feedback value, and operates a feedback controller (e.g. a proportional-integral (PI) or a proportional-integral-derivative (PID) controller, although other feedback controller types are contemplated herein, including a fuzzy controller, neural network, or other controller type).

The emissions variability module further controls an EGR fraction in response to the PI or PID controller output. The operations to control the EGR fraction include ordinary feedback control operations in response to the controller output, including at least operations of an EGR valve, a turbocharger bypass, an intake throttle, an exhaust throttle, and/or a variable geometry turbocharger position (slot position, vane position, or other control mechanism). The operations of various air handling system actuators to meet an EGR fraction target, once determined, are well understood in the art and are not discussed further here for purposes of clarity.

In certain embodiments, the controller includes a variability management enabling module that determines that a $NO_x$ sensor is warmed up, and/or determines that the engine is operating at steady state. The emissions variability module further performs EGR fraction control operations in response to the variability management enabling module indicating that the $NO_x$ sensor is warmed up and/or the engine is at steady state. Example operations to determine the engine is at steady state include determining that the engine is running with a δrpm/δt below a speed change threshold value, and determining that the engine is running with a δtorque/δt below a torque change threshold value for a predetermined time period. Any steady state determinations are contemplated herein, including determining that an engine is operating from a steady state fueling table, determining that engine speed is operating within a predefined speed band over a predetermined time period, and/or determining that engine torque is operating within a predefined torque band over a predetermined time period.

Another example controller includes the emissions variability module interpreting an exhaust $NO_x$ feedback value, an $O_2$ feedback value, and an engine speed value, an engine load value, and determining a target $NO_x$ value in response to the engine speed value and the engine load value. The emissions variability module further determines a $NO_x$ error value in response to the target $NO_x$ value and the exhaust $NO_x$ feedback value, and operates a feedback controller on the $NO_x$ error value. The emissions variability module controls an EGR fraction in response to the feedback controller output.

The example emissions variability module further determines a lambda (λ) target value in response to the engine speed value and load value, and determines a λ error value in response to the λ target value and the $O_2$ feedback value. The emissions variability controller further adjusts the operations of the feedback controller in response to the λ error value. Example operations to determine a λ target value include determining a combustion formula (e.g. an EGR fraction to achieve a desired emissions level at a given speed and torque output), and determining a λ value to achieve the EGR fraction in steady state at the given output values.

Additional operations of the emissions variability module include adjusting the operations of the feedback controller in response to the λ error value by applying a gain to the $NO_x$ feedback controller output (e.g. making the controller more responsive or less responsive), applying a gain to the $NO_x$ error value (again resulting in changing the responsiveness of the controller), and/or applying a gain to an actuator output command. Example actuators include an EGR valve, a variable geometry turbocharger position or setting, an intake valve, an exhaust valve, a bypass valve, a wastegate command, and/or an engine valve timing. An example emissions variability module utilizes a gain of less than one in adjusting the feedback controller, resulting in a reduced feedback controller response to the $NO_x$ error, and a reduced variability in the $NO_x$ output and/or the particulate matter (PM) output.

In certain embodiments, the emissions variability module adjusts the operations of the feedback controller in response to the absolute value of the λ error value decreasing, and/or disables the adjusting in response to the absolute value of the λ error value increasing. Disabling the adjusting includes turning off the adjusting, utilizing a gain of one for the adjusting during periods where the adjusting is disabled, or other adjustment disabling mechanisms. In the example where the adjusting makes the feedback controller less responsive, disabling the adjusting when the λ error increases restores normal responsiveness when a λ error above the threshold value is present.

An example controller includes an emissions variability transition module that operates a cost function on the adjusting, where the cost function utilizes at least the λ error as an input. The cost function allows the transient management adjustment to be variably responsive to the λ error, including allowing the λ error based adjustment to compete with other adjustments (not shown—for example emissions, transient detection, aftertreatment regeneration, limit management, or any other controller adjustments known in the art), and/or for the amount of adjustment to scale with the λ error more smoothly than a simple enable/disable cutoff value allows. An emissions variability transition module increases the cost function output value (i.e. deeming the λ error adjustment to be more expensive and/or less favored) in response to an increasing magnitude of the λ error value.

Yet another example controller includes an emissions variability module that interprets an exhaust $NO_x$ feedback value, an $O_2$ feedback value, an engine speed value, and an engine load value. The emissions variability module determines a target $NO_x$ value in response to the engine speed value and the engine load value. The emissions variability module further determines a $NO_x$ error value in response to the target $NO_x$ value and the exhaust $NO_x$ feedback value, and determines a λ target value in response to the engine speed value and load value. The emissions variability module further determines a λ error value in response to the λ target value and the $O_2$ feedback value. The $O_2$ feedback value is any oxygen determination within the system that can be utilized to determine the operating λ of the engine.

An example emissions variation module executes a two-input two-output controller, including the $NO_x$ error value as a first input and the λ error value as a second input, and further including an EGR tuning factor as a first output and a charge flow tuning factor as a second input. The use of the two-input two-output controller allows for scaled response to the $NO_x$ error value and the λ error value throughout a range of error values of interest. An example implementation includes a two-dimensional lookup table that provides two tuning factors (for the EGR and for the charge flow) for each $NO_x$ error value—λ error value pair, with interpolation within the table, and either extrapolation or fixing at the outermost values for error values outside the table ranges. The use of the two-input two-output controller can schedule responsiveness both with respect to the λ error, but also can schedule responsiveness of the EGR flow or the charge flow according to the desired engine operations. The two-input two-output controller can emulate the use of a cost function (e.g. allowing increased responsiveness as the λ error increases) and/or can be combined with the use of a cost function (e.g. to alter the way the two-input two-output controller competes with other system adjustments).

An example controller further includes an engine control module that operates a baseline EGR and charge flow controller, and the emissions variability module provides the EGR tuning factor and the charge flow tuning factor to each include an error gain adjustment and/or a controller output adjustment for the baseline controllers. In certain embodiments, the controller includes an emissions variability transition module that reduces an effect of the tuning factors of the two-input two-output controller at high λ error values, that operates a cost function on the λ error value, and/or that reduces an effect of the tuning factors of the two-input two-output controller at high cost function values.

Yet another example controller includes an engine control module that operates an internal combustion engine, and an emissions variability module that determines a λ target value as a function of engine speed and load. The emissions variability module determines a λ error value in response to the λ target value and an $O_2$ or $NO_x$ sensor output, and adjusts an EGR fraction to control the λ error value. Example operations to adjust the EGR fraction include controlling the λ error value into an acceptable range, controlling the λ error value to an acceptable range of δλ error/δt values, controlling the λ error value such that the λ is controlled toward a target mean λ value, and/or controlling the λ error value to prevent excursions of a δλ error/δt value.

In certain embodiments, the emissions variability module further adjusts an mass charge flow (MCF) control in response to the λ error value, determines a $NO_x$ error value, and/or adjusts the EGR fraction control and the MCF control further in response to the $NO_x$ error value. Additionally, or alternatively, the emissions variability module adjusts the MCF control with one or more of the following operations: controlling the λ error value into an acceptable range, controlling the λ error value to an acceptable range of δλ error/δt values, controlling the λ error value such that the λ is controlled toward a target mean λ value, controlling the λ error value to prevent excursions of a δλ error/δt value, controlling the $NO_x$ error value into an acceptable range, controlling the $NO_x$ error value to an acceptable range of $\delta NO_x$ error/δt values, controlling the $NO_x$ error value such that the $NO_x$ is controlled toward a target mean $NO_x$ value, and/or controlling the $NO_x$ error value to prevent excursions of a $\delta NO_x$ error/δt value.

In certain embodiments, the controller includes an emissions variability transition module that adjusts the EGR fraction by reducing a responsiveness of a baseline EGR fraction controller, reduces the responsiveness of the baseline EGR fraction in response to a λ error value being lower than a threshold value, and/or determines a λ controller cost function and increases a cost of the λ controller cost function in response to an increasing magnitude of the λ error value.

Figure 2:
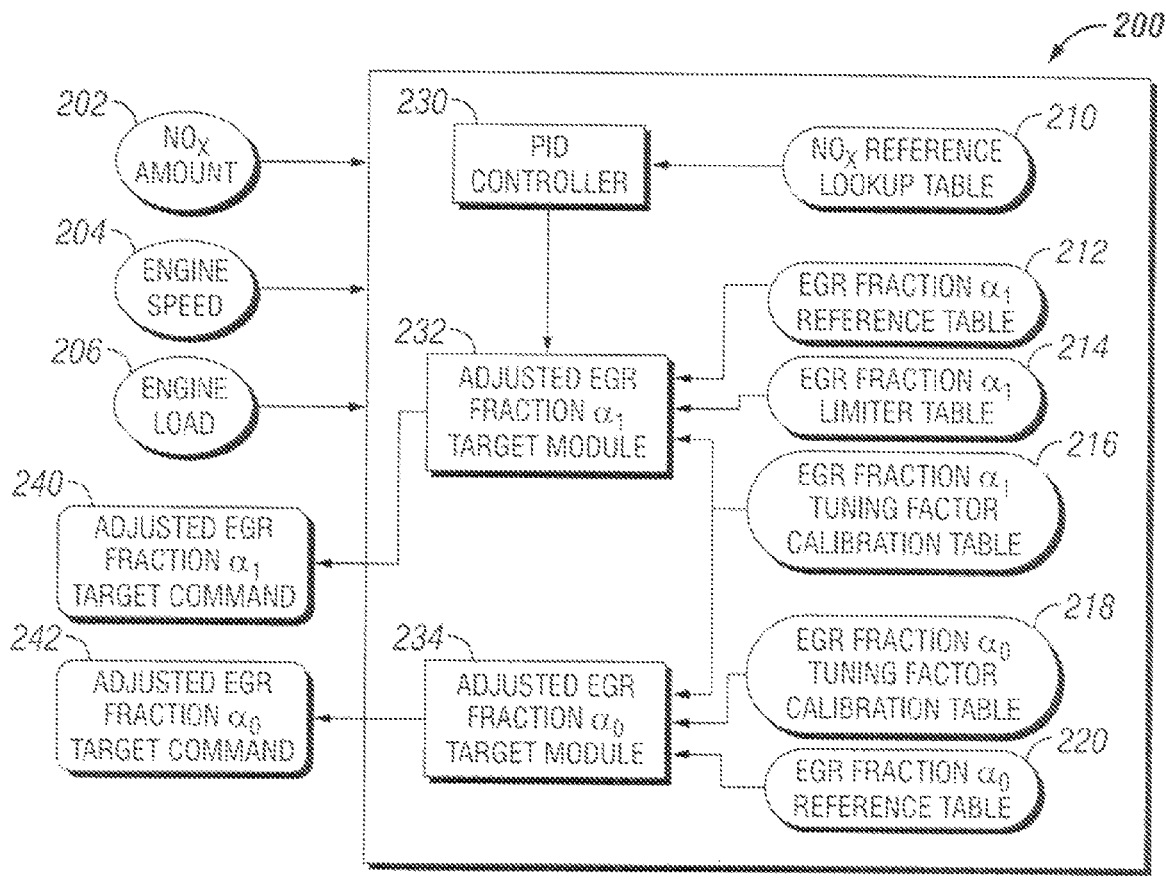
FIG. 2 is a diagram illustrating an exemplary $NO_x$-EGR controller apparatus for controlling emission variability.
Figure 3A:
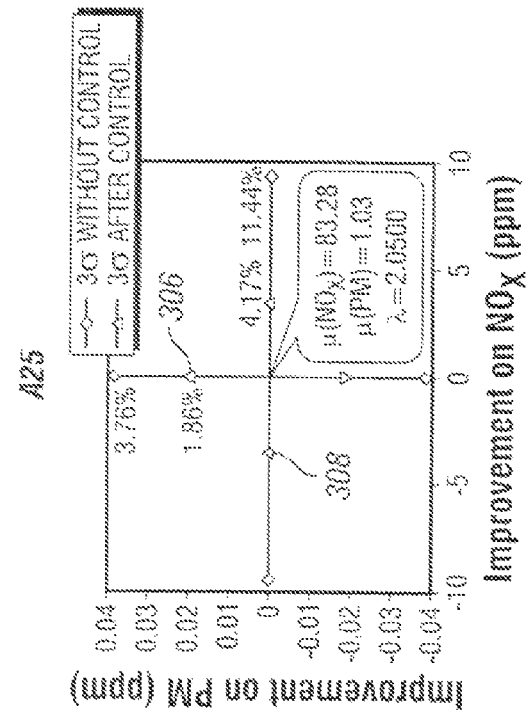
FIGS. 3A-3C are a series of plot diagrams illustrating output control plots of simulated performance data for the $NO_x$-EGR controller at 5% NOx bias.
Figure 3B:
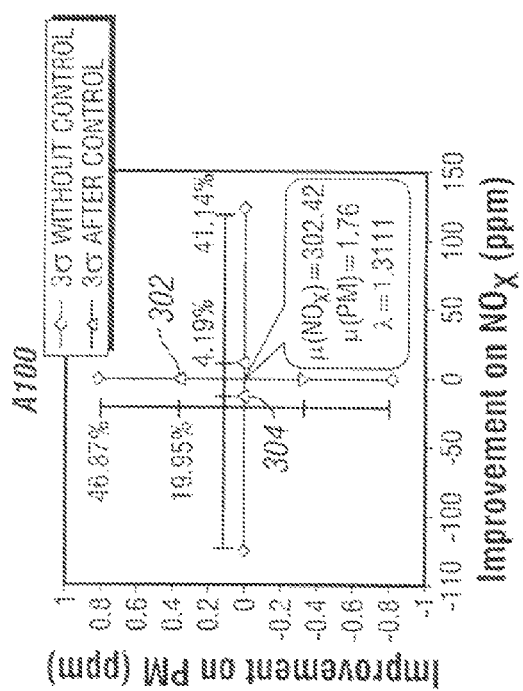
Figure 3C:
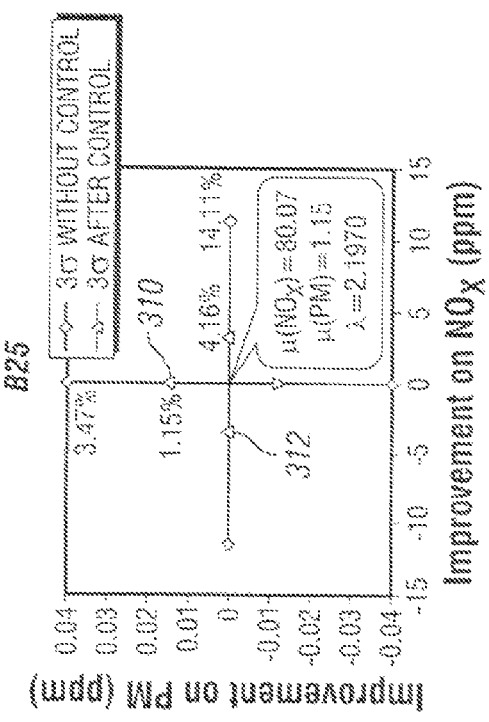
Figure 4B:
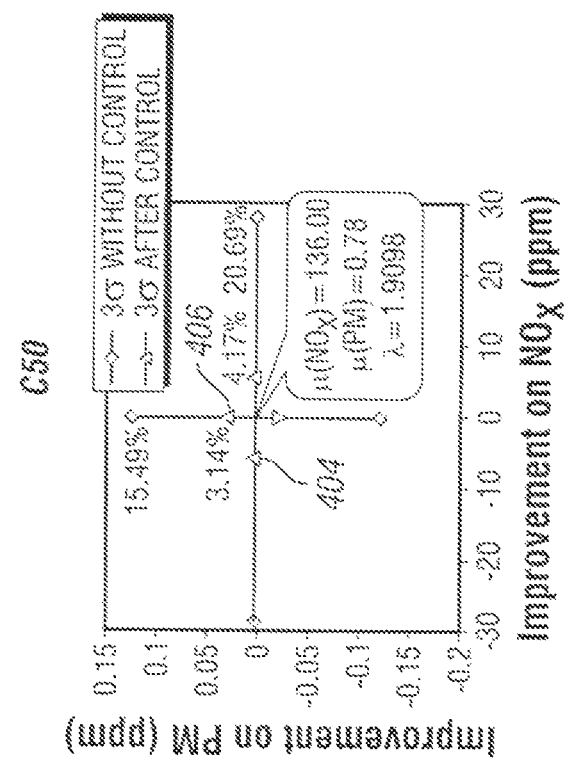
FIGS. 4A-4B are a series of plot diagrams illustrating output control plots of simulated performance data for the $NO_x$-EGR controller at 5% NOx bias.
Figure 4A:
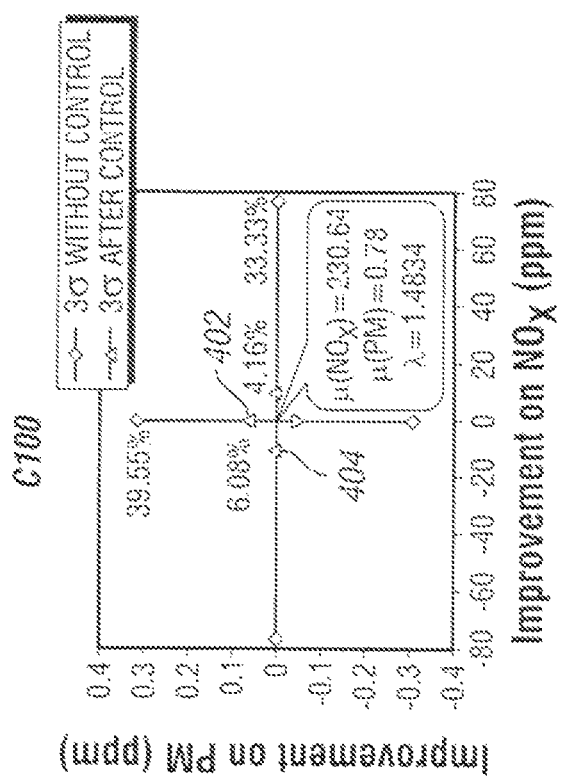
Figure 6A:
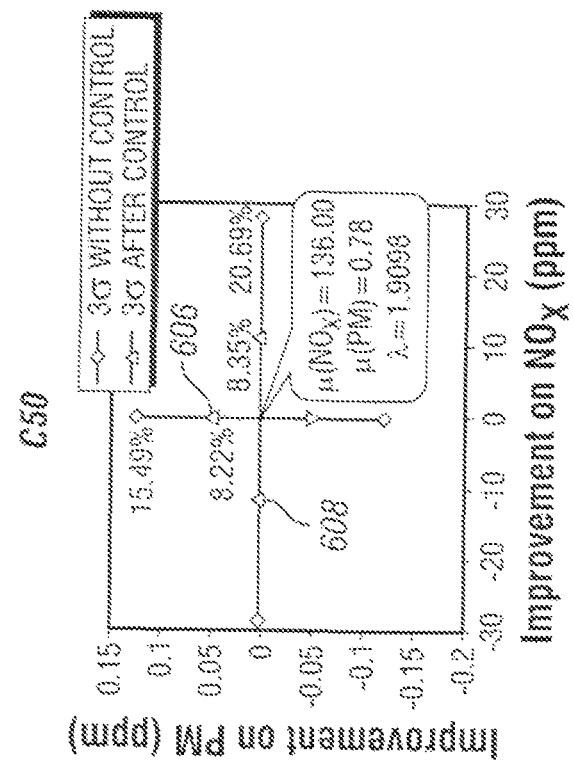
FIGS. 6A-6B are a series of plot diagrams illustrating output control plots of simulated performance data for the $NO_x$-EGR controller at 10% NOx bias.
Figure 6B:
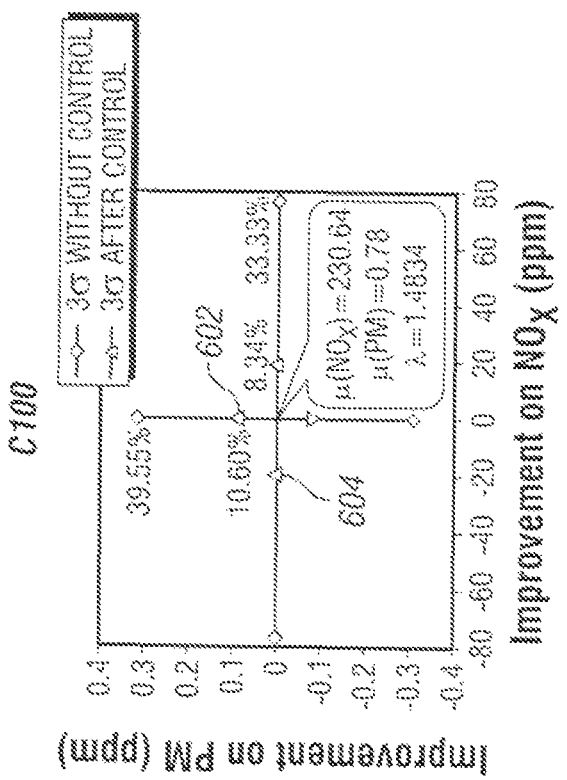
Figure 8B:
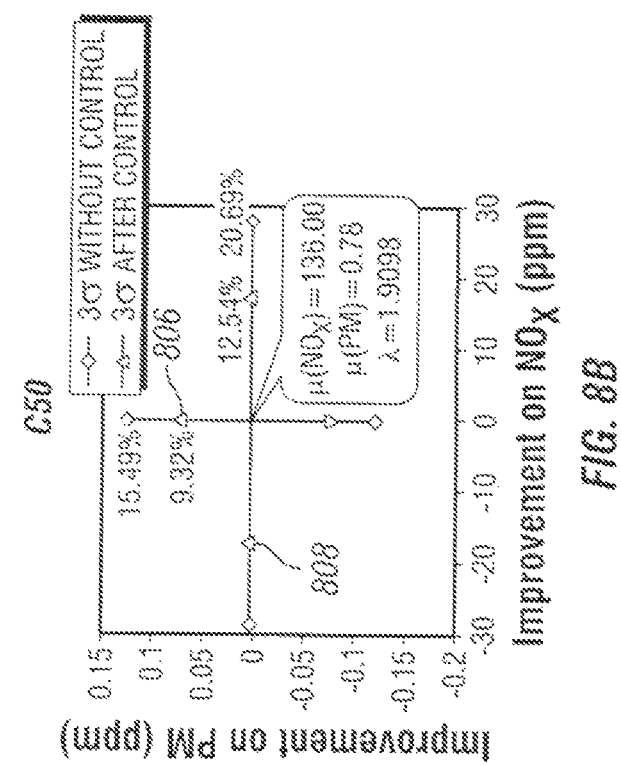
FIGS. 8A-8B are a series of plot diagrams illustrating output control plots of simulated performance data for the $NO_x$-EGR controller at 15% NOx bias.
Figure 8A:
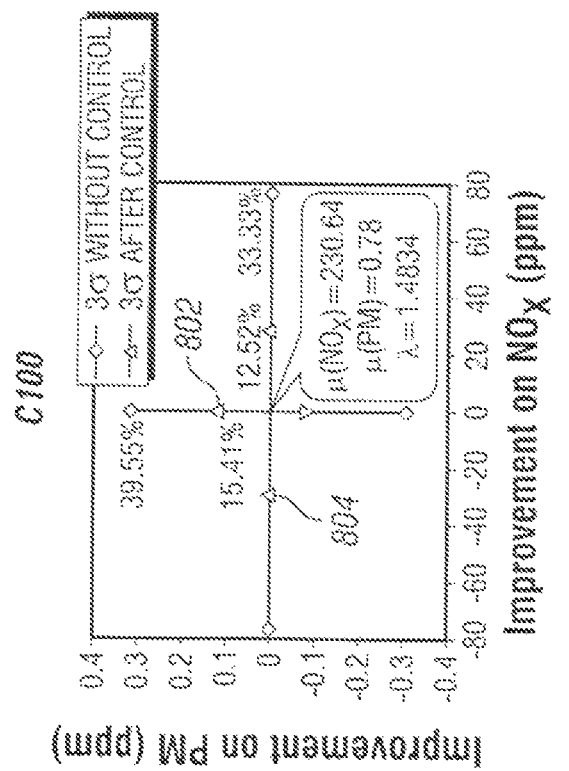

Referencing FIG. 2, a $NO_x$-EGR controller 200 is depicted which adjusts baseline EGR controls in response to a $NO_x$ error value. The controller 200 operates to determine a $NO_x$ reference value (a $NO_x$ target value) from, for example, reference lookup table 210 in response to an engine speed input 204 and an engine load input 206. A $NO_x$ amount input 202 from NOx sensor 114 is compared to the $NO_x$ reference value to determine a $NO_x$ error value, which is provided to a feedback controller (a PID controller 230 in the example of FIG. 2). Various EGR fraction tuning factor calibration tables 216, 218, and an EGR fraction tuning factor limiter table 214 are used to adjust the EGR fraction target (reference) tables 212, 220 for EGR fraction targets under either transient or non-transient operation, providing final adjusted EGR fraction target commands 240, 242 from adjusted EGR fraction target modules 232, 234.

Referencing FIGS. 3 through 8, emissions variability from simulated data are depicted for the $NO_x$-EGR controller 200 of FIG. 2. The "with control" plots include EGR fraction adjustments based on $NO_x$ error, while the "without control" plots are baseline controls that utilize a speed-load map to generate EGR fraction targets (e.g. EGR fraction reference tables 212, 220). The plots depict the 3-sigma excursion of emissions from the average for the simulated period. A robust simulation package was utilized, and it is believed that similar emissions variability control would be achieved on an engine in use. The points "A100", "A25", "B25", etc. reference speed-load designations; accordingly each plot depicts data for a given speed-load point. The data in FIGS. 3-4 have a 5% NOx bias (an increase) applied, and X-axis plot points 304, 308, 312, 404, 408 showing "with control" NOx emissions and Y-axis plot points 302, 306, 310, 402, 406 showing "with control" PM emissions. The data in FIGS. 5-6 have a 10% $NO_x$ bias applied, and X-axis plot points 504, 508, 512, 604, 608 showing "with control" NOx emissions and Y-axis plot points 502, 506, 510, 602, 606 showing "with control" PM emissions. The data in FIGS. 7-8 have a 15% $NO_x$ bias applied, and X-axis plot points 704, 708, 712, 804, 808 showing "with control" NOx emissions and Y-axis plot points 702, 706, 710, 802, 806 showing "with control" PM emissions. Virtually all of the simulations illustrate significantly increased control of emissions variability with the $NO_x$-EGR control activated. The A25 and B25 points with the 10% $NO_x$ increase do show improvement although somewhat less improvement than most other operating points. The B25 point with the 15% $NO_x$ increase shows very little improvement, and the A25 point with the 15% $NO_x$ increase actually shows a slight degradation in variability control with the $NO_x$-EGR control activated.

The type of data depicted in FIGS. 3-8 are readily generated by one of skill in the art contemplating a particular engine and application. Data such as depicted in FIGS. 3-8 can be utilized to refine the calibration tables 216, 218 and/or any cost function data (not depicted) to mitigate control adjustments which may occur in regions that are of less benefit. The aging profile of an engine, and/or resulting increases in $NO_x$ or PM output, can also be accounted for in the calibration and related cost functions.

Figure 9:
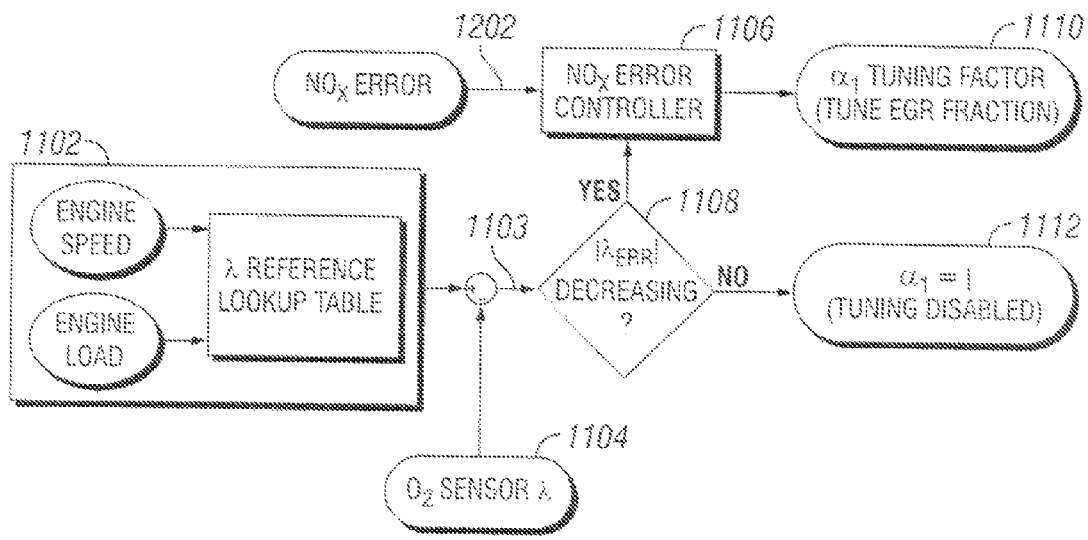
FIG. 9 is a flow diagram of a procedure of a control adjustment scheme for determining an EGR fraction tuning factor.

Referencing FIG. 9, an alternate control adjustment scheme is depicted. A $NO_x$ error controller 1106 provides an alpha-one tuning factor 1110 that adjusts EGR fraction targets and/or control response. The $NO_x$ error 1202 is an input to the controller 1106. A λ-based reference table 1102 is provided that provides a λ reference (target) as an output, and is compared to a feedback λ 1104 to generate a λ error 1103. If the absolute value of λ error 1103 is decreasing (at test 1108), the controller 1106 is enabled and the adjusted alpha-one tuning factor 1110 is utilized. If the absolute value of λ error 1103 is not decreasing (at test 1108), the alpha-one tuning factor 1112 is disabled (or provided as a gain of "1" as depicted in FIG. 9). The control adjustment of FIG. 9 may be termed a "λ limit control." The control adjustment of FIG. 9 is simplified, and may include, for example, smoothly transitioning between application and/or disabling of the alpha-one tuning factor rather than abrupt switching as depicted.

Figure 10:
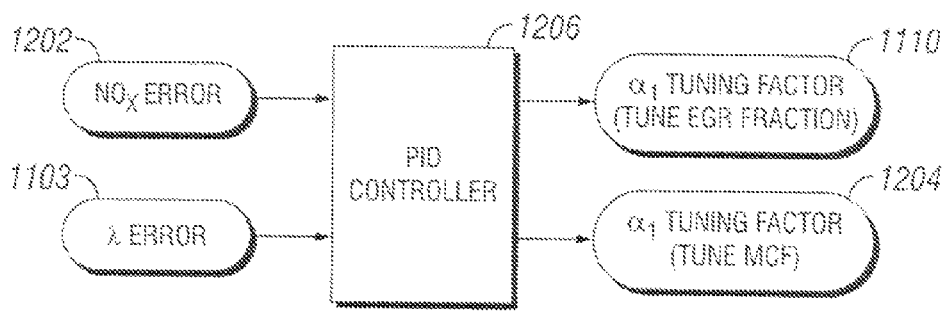
FIG. 10 is a flow diagram of a procedure of a control adjustment scheme for determining a tuning factor for an EGR control and an MCF control.

Referencing FIG. 10, yet another control adjustment scheme is depicted. A $NO_x$ error 1202 and a λ error 1103 are provided to a MIMO (multiple-input multiple-output; in the example two-input two-output) controller, which may include one or more lookup tables or other calculations to provide tuning factors 1110, 1204 for EGR control and MCF control of an engine. The tuning factors may be limited or enabled for various considerations, including the increases of the λ error or $NO_x$ error, at certain engine operating conditions, or for other considerations understood in the art.

The schematic flow descriptions which follow provides illustrative embodiments of performing procedures for controlling an internal combustion engine. Operations illustrated are understood to be exemplary only, and operations may be combined or divided, and added or removed, as well as reordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes operating an internal combustion engine having an exhaust stream, an exhaust gas recirculation stream, and an exhaust $NO_x$ feedback value, and an operation to interpret an engine speed value and an engine load value, and determining a target $NO_x$ value in response to the engine speed value and the engine load value. The target $NO_x$ value from the engine speed value and the engine load value may be determined from a lookup table, and may include values, for example, designed to meet an overall emissions level for the engine. The procedure further includes an operation to determine a $NO_x$ error value in response to the target $NO_x$ value and the exhaust $NO_x$ feedback value, to operate a feedback controller (e.g. a PI or PID controller, although other feedback controller types are contemplated herein, including a fuzzy controller, neural network, or other controller type). The procedure further includes an operation to control an EGR fraction in response to the PI or PID controller output. The operations to control the EGR fraction include ordinary feedback control operations in response to the controller output, including at least operations of an EGR valve, a turbocharger bypass, an intake throttle, an exhaust throttle, and/or a variable geometry turbocharger position (slot position, vane position, or other control mechanism). The operations of various air handling system actuators to meet an EGR fraction target, once determined, are well understood in the art and are not discussed further here for purposes of clarity.

In certain embodiments, the procedure includes operating the controller in response to determining that a $NO_x$ sensor is warmed up, and/or to determining that the engine is operating at steady state. Example operations to determine the engine is at steady state include determining that the engine is running with a δrpm/δt below a speed change threshold value, and determining that the engine is running with a δtorque/δt below a torque change threshold value for a predetermined time period. Any steady state determinations are contemplated herein, including determining that an engine is operating from a steady state fueling table, determining that engine speed is operating within a predefined speed band over a predetermined time period, and/or determining that engine torque is operating within a predefined torque band over a predetermined time period.

Another example procedure includes operating an internal combustion engine having an exhaust stream, an exhaust gas recirculation stream, an exhaust $NO_x$ feedback value, and an $O_2$ feedback value, an operation to interpret an engine speed value and an engine load value, and an operation to determine a target $NO_x$ value in response to the engine speed value and the engine load value. The procedure includes an operation to determine a $NO_x$ error value in response to the target $NO_x$ value and the exhaust $NO_x$ feedback value, operating a feedback controller on the $NO_x$ error value, and controlling an EGR fraction in response feedback controller output. The procedure further includes an operation to determine a λ target value in response to the engine speed value and load value, an operation to determine a λ error value in response to the λ target value and the 02 feedback value, and an operation to adjust the operations of the controller in response to the λ error value. The operation to determine a λ target value includes, for example, determining a combustion formula (e.g. an EGR fraction to achieve a desired emissions level at a given speed and torque output), and determining a λ value to achieve the EGR fraction in steady state at the given output values.

Operations to adjust the operations of the controller in response to the λ error value include applying a gain to the $NO_x$ feedback controller output (e.g. making the controller more responsive or less responsive), applying a gain to the $NO_x$ error value (again resulting in changing the responsiveness of the controller), and/or applying a gain to an actuator output command from the controller. An example procedure includes utilizing a gain of less than one, resulting in a reduced controller response to the $NO_x$ error, and a reduced variability in the $NO_x$ output and/or the PM output.

In certain embodiments, the procedure includes adjusting the operations of the controller in response to the absolute value of the λ error value decreasing, and/or disabling the adjusting in response to the absolute value of the λ error value increasing. Disabling the adjusting includes turning off the adjusting, utilizing a gain of one for the adjusting during periods where the adjusting is disabled, or other adjustment disabling mechanisms. In the example where the adjusting makes the controller less responsive, disabling the adjusting when the λ error increases restores normal responsiveness when a λ error is present.

An example procedure includes operating a cost function on the adjusting, where the cost function utilizes at least the λ error as an input. The cost function allows the controller adjusting to be variably responsive to the λ error, including allowing the λ error based adjustment to compete with other adjustments (not shown—for example emissions, transient detection, aftertreatment regeneration, limit management, or any other controller adjustments known in the art), and/or for the amount of adjustment to scale with the λ error more smoothly than a simple enable/disable cutoff value allows. An example cost function operation includes increasing the cost function output value (i.e. deeming the λ error adjustment to be more expensive and/or less favored) in response to an increasing magnitude of the λ error value.

Yet another example procedure includes operating an internal combustion engine having an exhaust stream, an exhaust gas recirculation stream, an exhaust $NO_x$ feedback value, and an $O_2$ feedback value, and an operation to interpret an engine speed value and an engine load value, and to determine a target $NO_x$ value in response to the engine speed value and the engine load value. The procedure further includes an operation to determine a $NO_x$ error value in response to the target $NO_x$ value and the exhaust $NO_x$ feedback value, to determine a λ target value in response to the engine speed value and load value, and an operation to determine a λ error value in response to the λ target value and the $O_2$ feedback value.

The procedure further includes an operation to execute a two-input two-output controller, including the $NO_x$ error value as a first input and the λ error value as a second input, and further includes an EGR tuning factor as a first output and a charge flow tuning factor as a second input. The use of the two-input two-output controller allows for scaled response to the $NO_x$ error value and the λ error value throughout a range of error values of interest. An example implementation includes a two-dimensional lookup table that provides two tuning factors (for the EGR and for the charge flow) for each $NO_x$ error value—λ error value pair, with interpolation within the table, and either extrapolation or fixing at the outermost values for error values outside the table ranges. The use of the two-input two-output controller can schedule responsiveness both with respect to the λ error, but also can schedule responsiveness of the EGR flow or the charge flow according to the desired engine operations. The two-input two-output controller can emulate the use of a cost function (e.g. allowing increased responsiveness as the λ error increases) and/or can be combined with the use of a cost function (e.g. to alter the way the two-input two-output controller competes with other system adjustments).

An example procedure further includes operating a baseline EGR and charge flow controller, and EGR tuning factor and the charge flow tuning factor each include an error gain adjustment and/or a controller output adjustment for the baseline controllers. In certain embodiments, the procedure includes reducing an effect of the tuning factors of the two-input two-output controller at high λ error values, operating a cost function on the λ error value, and/or reducing an effect of the tuning factors of the two-input two-output controller at high cost function values. In certain embodiments, the procedure includes an operation to determine that a $NO_x/O_2$ sensor is warmed up, and/or determining that an engine is running at steady state, before operating the two-input two-output controller.

Yet another example procedure includes operating an internal combustion engine, and an operation to determine a λ target value as a function of engine speed and load. The procedure includes an operation to determine a λ error value in response to the λ target value and an $O_2$ or $NO_x$ sensor output, and an operation to adjust an EGR fraction to control the λ error value. Example operations to adjust the EGR fraction include controlling the λ error value into an acceptable range, controlling the λ error value to an acceptable range of δλ error/δt values, controlling the λ error value such that the λ is controlled toward a target mean λ value, and/or controlling the λ error value to prevent excursions of a δλ error/δt value.

In certain embodiments, the procedure further includes an operation to adjust an MCF control in response to the λ error value, to determine a $NO_x$ error value, and/or to adjust the EGR fraction control and the MCF control further in response to the $NO_x$ error value. Additionally or alternatively, the procedure having MCF control includes one or more of the following operations: controlling the λ error value into an acceptable range, controlling the λ error value to an acceptable range of δλ error/δt values, controlling the λ error value such that the λ is controlled toward a target mean λ value, controlling the λ error value to prevent excursions of a δλ error/δt value, controlling the $NO_x$ error value into an acceptable range, controlling the $NO_x$ error value to an acceptable range of δ $NO_x$ error/δt values, controlling the $NO_x$ error value such that the $NO_x$ is controlled toward a target mean $NO_x$ value, and/or controlling the $NO_x$ error value to prevent excursions of a δ$NO_x$ error/δt value.

In certain embodiments, the procedure includes the operation to adjust the EGR fraction by reducing a responsiveness of a baseline EGR fraction controller, reducing the responsiveness of the baseline EGR fraction in response to a λ error value being lower than a threshold value, and/or determining a λ controller cost function and increasing a cost of the λ controller cost function in response to an increasing magnitude of the λ error value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine having an exhaust stream, an exhaust gas recirculation (EGR) stream, and an exhaust $NO_x$ feedback value;
   interpreting an engine speed value and an engine load value, and determining a target $NO_x$ value in response to the engine speed value and the engine load value;
   determining a $NO_x$ error value in response to the target $NO_x$ value and the exhaust NOx feedback value;
   operating a proportional-integral (PI) or a proportional-integral-derivative (PID) controller on the $NO_x$ error value, and controlling an EGR fraction in response to the PI or PID controller output;
   determining a lambda ($\lambda$) target value in response to the engine speed value and load value;
   determining a $\lambda$ error value in response to the $\lambda$ target value and an $O_2$ feedback value; and
   adjusting the operations of the PI or PID controller in response to an absolute value of the $\lambda$ error value decreasing.

2. The method of claim 1, further comprising operating the PI or PID controller in response to determining that a $NO_x$ sensor is warmed up.

3. The method of claim 1, further comprising operating the PI or PID controller in response to determining that the engine is running at a steady state.

4. The method of claim 3, wherein the determining the engine is running at steady state comprises determining that the engine is running with a $\delta rpm/\delta t$ below a speed change threshold value and determining that the engine is running with a $\delta torque/\delta t$ below a torque change threshold value for a predetermined time period.

5. A method, comprising:
   operating an internal combustion engine having an exhaust stream, an exhaust gas recirculation (EGR) stream, an exhaust $NO_x$ feedback value, and an $O_2$ feedback value;
   interpreting an engine speed value and an engine load value, and determining a target $NO_x$ value in response to the engine speed value and the engine load value;
   determining a $NO_x$ error value in response to the target $NO_x$ value and the exhaust $NO_x$ feedback value;
   operating a feedback controller on the $NO_x$ error value, and controlling an EGR fraction in response to a feedback controller output;
   determining a lambda ($\lambda$) target value in response to the engine speed value and load value;
   determining a $\lambda$ error value in response to the $\lambda$ target value and the $O_2$ feedback value; and
   adjusting the operations of the feedback controller in response to the $\lambda$ error value.

6. The method of claim 5, wherein the adjusting further comprises adjusting the operations of the feedback controller in response to the absolute value of the $\lambda$ error value decreasing.

7. The method of claim 5, further comprising disabling the adjusting when the absolute value of the $\lambda$ error value is increasing.

8. The method of claim 5, wherein the adjusting comprises applying a gain value to the feedback controller output.

9. The method of claim 5, further comprising operating a cost function on the adjusting.

10. The method of claim 9, wherein the operating the cost function comprises increasing the cost function output value in response to an increasing magnitude of the $\lambda$ error value.

11. The method of claim 5, further comprising operating the feedback controller in response to determining that a $NO_x$ sensor is warmed up.

12. The method of claim 5, further comprising operating the feedback controller in response to determining that the engine is running at a steady state.

13. A method, comprising:
   operating an internal combustion engine having an exhaust stream, an exhaust gas recirculation (EGR) stream, an exhaust $NO_x$ feedback value, and an $O_2$ feedback value;
   interpreting an engine speed value and an engine load value, and determining a target $NO_x$ value in response to the engine speed value and the engine load value;
   determining a $NO_x$ error value in response to the target $NO_x$ value and the exhaust $NO_x$ feedback value;
   determining a lambda ($\lambda$) target value in response to the engine speed value and load value;
   determining a $\lambda$ error value in response to the $\lambda$ target value and the $O_2$ feedback value; and
   operating a two-input two-output controller, comprising the $NO_x$ error value as a first input and the $\lambda$ error value as a second input to the two-input two-output controller, and comprising an EGR tuning factor as a first output and a mass charge flow (MCF) tuning factor as a second output of the two-input two-output controller.

14. The method of claim 13, further comprising operating a baseline EGR and charge flow controller, and wherein the EGR tuning factor and the MCF tuning factor each comprise one of an error gain adjustment and a controller output adjustment.

15. The method of claim 13, further comprising operating the two-input two-output controller only in response to determining that an engine is running at steady state.

16. The method of claim 13, further comprising reducing an effect of the EGR and MCF tuning factors of the two-input two-output controller at high $\lambda$ error values.

17. The method of claim 13, further comprising operating a cost function on the $\lambda$ error value, and reducing an effect of the EGR and MCF tuning factors of the two-input two-output controller at high cost function values.

18. The method of claim 13, further comprising operating the two-input two-output controller only in response to determining that a $NO_x/O_2$ sensor is warmed up.

19. The method of claim 14, wherein the determining the engine is running at steady state comprises determining that the engine is running within a predetermined engine speed band and a predetermined engine torque band for a predetermined time period.

20. A method, comprising:
   operating an internal combustion engine;
   determining a lambda ($\lambda$) target value as a function of an engine speed and an engine load;
   determining a $\lambda$ error value in response to the $\lambda$ target value and an $O_2$ sensor output or a $NO_x$ sensor output; and
   adjusting an exhaust gas recirculation (EGR) fraction to control the $\lambda$ error value.

21. The method of claim 20, wherein the adjusting the EGR fraction to control the $\lambda$ error value comprises at least one operation selected from the operations consisting of:
   controlling the $\lambda$ error value into an acceptable range;
   controlling the $\lambda$ error value to an acceptable range of $\delta\lambda$ error/$\delta t$ values;
   controlling the $\lambda$ error value such that the $\lambda$ is controlled toward a target mean $\lambda$ value; and
   controlling the $\lambda$ error value to prevent excursions of a $\delta\lambda$ error/$\delta t$ value.

22. The method of claim 20, further comprising adjusting a mass charge flow (MCF) control in response to the λ error value.

23. The method of claim 22, further comprising determining a $NO_x$ error value, and adjusting at least one of the EGR fraction control and the MCF control further in response to the $NO_x$ error value.

24. The method of claim 23, wherein the adjusting at least one of the EGR fraction control and the MCF control comprises at least one operation selected from the operations consisting of:
controlling the λ error value into an acceptable range;
controlling the λ error value to an acceptable range of δλ error/δt values;
controlling the λ error value such that the λ is controlled toward a target mean λ value;
controlling the λ error value to prevent excursions of a δλ error/δt value
controlling the $NO_x$ error value into an acceptable range;
controlling the $NO_x$ error value to an acceptable range of δ $NO_x$ error/δt values;
controlling the $NO_x$ error value such that the $NO_x$ is controlled toward a target mean $NO_x$ value; and
controlling the $NO_x$ error value to prevent excursions of a δ$NO_x$ error/δt value.

25. The method of claim 20, further comprising adjusting the EGR fraction by reducing a responsiveness of a baseline EGR fraction controller.

26. The method of claim 25, wherein the reducing the responsiveness is performed in response to a λ error value being lower than a threshold value.

27. The method of claim 26, further comprising determining a λ controller cost function, and increasing a cost of the λ controller cost function in response to an increasing magnitude of the λ error value.

* * * * *